(12) United States Patent
Collison et al.

(10) Patent No.: US 9,285,039 B2
(45) Date of Patent: Mar. 15, 2016

(54) SLEEVE SEAL ASSEMBLY AND ROTARY VALVE HAVING SLEEVE SEAL ASSEMBLY

(71) Applicant: FISHER CONTROLS INTERNATIONAL LLC, Marshalltown, IA (US)

(72) Inventors: Randall S. Collison, Bondurant, IA (US); Loren L. Bovee, Marshalltown, IA (US); Tonya Probasco, Tama, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/167,614

(22) Filed: Jan. 29, 2014

(65) Prior Publication Data

US 2014/0166917 A1    Jun. 19, 2014

Related U.S. Application Data

(63) Continuation of application No. 12/771,309, filed on Apr. 30, 2010.

(51) Int. Cl.
*F16K 5/06* (2006.01)

(52) U.S. Cl.
CPC ............. *F16K 5/0663* (2013.01); *F16K 5/0636* (2013.01); *F16K 5/0678* (2013.01)

(58) Field of Classification Search
CPC ... F16K 5/0663; F16K 5/0678; F16K 5/0636; F16K 5/0689
USPC ........ 251/314, 61.5, 174, 180, 159, 160, 172, 251/315.01, 315.12; 128/205.24, 205.26
See application file for complete search history.

(56) References Cited

U.S. PATENT DOCUMENTS

| | | |
|---|---|---|
| 3,565,392 A | 2/1971 | Bryant et al. |
| 3,870,071 A | 3/1975 | Graham et al. |

(Continued)

FOREIGN PATENT DOCUMENTS

| | | |
|---|---|---|
| EP | 0 120 556 A1 | 10/1984 |
| FR | 1 466 302 A | 1/1967 |

(Continued)

OTHER PUBLICATIONS

English Translation of Notice of Reasons for Refusual for Japanese Patent Application No. 2013508008, mailed Jan. 7, 2015.

(Continued)

*Primary Examiner* — Marina Tietjen
(74) *Attorney, Agent, or Firm* — Marshall, Gerstein & Borun LLP (57) ABSTRACT

A fluid flow control device includes a valve body, a bonnet, a control assembly, an internal recess, and a seal assembly. The valve body defines an inlet portion, an outlet portion, a bonnet opening, and a fluid flow path extending between the inlet portion and the outlet portion. The bonnet is disposed in the bonnet opening. The control assembly is at least partly supported by the bonnet, and includes a ball element disposed within the valve body and rotatable between an open position and a closed position. The internal recess is defined by the valve body downstream from the inlet portion and adjacent the bonnet opening. The seal assembly is disposed within the internal recess and includes a movable sleeve seal, a retaining device, a biasing element, and one or more sealing elements for preventing leakage between the sleeve seal and the retaining device and/or the valve body.

20 Claims, 5 Drawing Sheets

(56) References Cited

U.S. PATENT DOCUMENTS

| | | |
|---|---|---|
| 3,912,220 A | 10/1975 | Vasicek et al. |
| 4,084,608 A | 4/1978 | Laignel et al. |
| 4,111,393 A | 9/1978 | McClurg et al. |
| 4,137,936 A | 2/1979 | Sekimoto et al. |
| 4,280,522 A | 7/1981 | Pechnyo et al. |
| 4,292,989 A | 10/1981 | Cazzaniga et al. |
| 4,477,055 A | 10/1984 | Partridge |
| 4,519,579 A | 5/1985 | Brestel et al. |
| 4,587,990 A | 5/1986 | Pennell et al. |
| 4,718,444 A | 1/1988 | Boelte |
| 4,911,408 A | 3/1990 | Kemp |
| 5,016,857 A | 5/1991 | Bovee et al. |
| 5,169,123 A | 12/1992 | Martin et al. |
| 5,419,532 A | 5/1995 | Fan |
| 5,482,249 A | 1/1996 | Schafbuch et al. |
| 5,533,738 A | 7/1996 | Hoffmann |
| 5,707,042 A | 1/1998 | Maselli et al. |
| 6,340,029 B1 | 1/2002 | Jun |
| 6,378,842 B1 | 4/2002 | Frese et al. |
| 7,484,710 B2 | 2/2009 | Koester et al. |
| 8,177,189 B2 | 5/2012 | Jackson et al. |
| 2001/0045231 A1 | 11/2001 | Monod |
| 2004/0200988 A1 | 10/2004 | Lorenz et al. |
| 2005/0269545 A1 | 12/2005 | Chiba et al. |
| 2006/0017035 A1 | 1/2006 | Bearer et al. |
| 2008/0179558 A1 | 7/2008 | Lloyd |
| 2009/0065726 A1 | 3/2009 | Hostetter et al. |
| 2009/0095931 A1 | 4/2009 | Stunkard |
| 2010/0200791 A1 | 8/2010 | Yung et al. |

FOREIGN PATENT DOCUMENTS

| | | |
|---|---|---|
| FR | 1511626 A | 2/1968 |
| GB | 2 105 010 A | 3/1983 |
| JP | 2005315348 A | 11/2005 |
| WO | WO-2009032569 A1 | 3/2009 |

OTHER PUBLICATIONS

Communication Relating to the Results of the Partial International Search for PCT/US2011/032636, dated Jul. 25, 2011.

International Search Report for PCT/US2011/032636, dated Sep. 20, 2011.

Written Opinion for PCT/US2011/032636, dated Sep. 20, 2011.

English Translation of Notice of Reasons for Refusal from JP Application No. 2013-508008 dated Sep. 3, 2015.

SLEEVE SEAL ASSEMBLY AND ROTARY
VALVE HAVING SLEEVE SEAL ASSEMBLY

CROSS-REFERENCE TO RELATED
APPLICATIONS

The present application is a continuation of U.S. patent application Ser. No. 12/771,309, filed Apr. 30, 2010 and entitled "Sleeve Seal Assembly And Rotary Valve Having Sleeve Seal Assembly," the disclosure of which is hereby expressly incorporated herein by reference.

FIELD OF THE DISCLOSURE

The present disclosure relates to fluid flow control devices and, more particularly, to rotary ball-type fluid flow control valves.

BACKGROUND

Rotary ball valves are used in a wide number of process control system applications to control some parameters of a process fluid such as a liquid, gas, slurry, etc. While the process control system may use a control valve to ultimately control the pressure, level, pH, or other desired parameter of a fluid, the control valve basically controls the rate of fluid flow.

Typically, a rotary ball valve includes a valve body defining a fluid inlet and a fluid outlet. A ball element is mounted in the valve body and rotates about a fixed axis into and out of abutment with a seal assembly, thereby controlling the amount of fluid flow through the valve. With typical bolted in-line ball valves, the seal assembly is inserted into the valve body through the fluid inlet, and retained adjacent to a flange of the valve body with a seal protector ring.

Rotary ball valve components, including the valve body, the ball element, and the seal assembly, are typically constructed of metal. This stands especially true when used in high pressure and/or high temperature applications. However, the ball element and seal assembly can suffer wear due to the repeated engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly, as well as between the seal assembly and the valve body. Similarly, because the frictional forces tend to increase as the components become more worn, the dynamic performance and control characteristics within the valve are worsened, resulting in inefficiencies and inaccuracies in the valve. To alleviate some of these concerns, some seal assemblies are biased such as to provide a more reliable seal against the ball in the closed position. Regardless of the specific type of seal assembly utilized, the entire rotary ball valve must be unbolted from the fluid process control system to replace the seal assembly in the event it becomes worn or otherwise ineffective.

SUMMARY

One aspect of the present disclosure provides a fluid flow control device including a valve body, a bonnet, a control assembly, an internal recess, and a seal assembly. The valve body defines an inlet portion, an outlet portion, a bonnet opening, and a fluid flow path extending between the inlet portion and the outlet portion. The bonnet is disposed in the bonnet opening and secured to the valve body. The control assembly is at least partly supported by the bonnet, and includes a ball element disposed within the valve body and rotatable between an open position and a closed position. The internal recess is defined by the valve body at a location downstream from the inlet portion and adjacent the bonnet opening. The seal assembly is disposed within the internal recess of the valve body and includes a sleeve seal, a retaining device, a biasing element, and a sealing element. The sleeve seal is axially movable along a direction of the flow path and adapted to be sealingly engaged by the ball element when the ball element occupies the closed position. The sleeve seal includes a sealing leg portion in sliding contact with the retaining device and a biased leg portion in sliding contact with the valve body. The retaining device is attached to the valve body adjacent to the internal recess to retain the sleeve seal in the valve body and between at least a portion of the sleeve seal and the ball element to limit displacement of the sleeve seal in the valve body toward the ball element. The biasing element is arranged between a portion of the valve body and the sleeve seal to bias the biased leg portion toward the ball element. The sealing element is arranged to provide a fluid tight seal between the sleeve seal and at least one of the retaining device and the valve body to prevent leakage when the ball element is in the closed position.

In one embodiment, the bonnet opening has a dimension that is greater than a largest dimension of the seal assembly such that the seal assembly can be loaded into the valve body through the bonnet opening.

In one embodiment, the recess in the valve body comprises an annular recess disposed coaxially with the inlet portion of the valve body.

In one embodiment, the sealing element comprises a sealing ring disposed at an interface between the sleeve seal and one of the retaining device and the valve body.

In one embodiment, the sealing element is disposed between opposing axial surfaces of the sleeve seal and the retaining device.

In one embodiment, the sealing element is disposed between opposing radial surfaces of the sleeve seal and one of the retaining device and the valve body.

In one embodiment, the sealing element comprises a C-seal defining an annular shaped opening for receiving fluid from the inlet portion of the valve body.

In one embodiment, the biasing element comprises a wave spring.

Another aspect of the present disclosure provides a fluid flow control device including a valve body, a control assembly, an internal recess, and a seal assembly. The valve body defines an inlet portion, an outlet portion, and a fluid flow path extending between the inlet portion and the outlet portion. The control assembly includes a ball element disposed within the valve body and rotatable between an open position and a closed position. The internal recess is defined by the valve body at a location downstream from the inlet portion. The seal assembly is disposed within the internal recess of the valve body and includes a sleeve seal, a retaining device, a biasing element, and a C-seal. The sleeve seal is axially movable along a direction of the flow path and adapted to be sealingly engaged by the ball element when the ball element occupies the closed position. The sleeve seal includes a sealing leg portion in sliding contact with the retaining device and a biased leg portion in sliding contact with the valve body. The retaining device is attached to the valve body adjacent to the internal recess to retain the sleeve seal in the valve body and between at least a portion of the sleeve seal and the ball element to limit displacement of the sleeve seal in the valve body toward the ball element. The biasing element is arranged between a portion of the valve body and the sleeve seal to bias the biased leg portion toward the ball element. The C-seal is disposed between the sleeve seal and one of the retaining device and the valve body to prevent leakage when the ball element is in the closed position.

In one embodiment, the device further includes a bonnet opening defined by the valve body and a bonnet disposed in the bonnet opening, the bonnet at least partly supporting the control element, the bonnet opening being disposed adjacent to the seal assembly.

In one embodiment, the bonnet opening has a dimension that is greater than a largest dimension of the seal assembly such that the seal assembly can be loaded into the valve body through the bonnet opening.

In one embodiment, the recess in the valve body comprises an annular recess disposed coaxially with the inlet portion of the valve body.

In one embodiment, the C-seal is disposed between opposing axial surfaces of the sleeve seal and the retaining device.

In one embodiment, the C-seal is disposed between opposing radial surfaces of the sleeve seal and one of the retaining device and the valve body.

In one embodiment, the C-seal defines an annular shaped opening for receiving fluid from the inlet portion of the valve body.

Another aspect of the present disclosure provides a seal assembly for a rotary ball valve, wherein the seal assembly includes a sleeve seal, a retaining device, a biasing element, and a first sealing element. The sleeve seal is adapted to be mounted adjacent an inlet portion of a rotary valve body and to be engaged by a ball element of the rotary ball valve when the ball element occupies a closed position. The sleeve seal includes a sealing leg portion and a biased leg portion adapted to be in sliding contact with the rotary valve body. The retaining device is adapted to be attached to the rotary valve body between at least a portion of the sleeve seal and the rotary valve body to retain the sleeve seal in the rotary valve body. The sealing leg portion of the sleeve seal is in sliding contact with the retaining device. The retaining device defines an annular channel. The biasing element is adapted to be disposed between a portion of the rotary valve body and the sleeve seal to bias the biased leg portion toward the ball element. The first sealing element is disposed within the annular channel of the retaining device and adapted to provide a fluid tight seal between the sleeve seal and the retaining device to prevent leakage when the ball element is in the closed position.

In one embodiment, the annular channel is defined in an axial end surface of the retaining device, and the first sealing element is disposed within the annular channel between opposing axial surfaces of the sleeve seal and the retaining device.

In one embodiment, the annular channel is defined in a radial surface of the retaining device, and the first sealing element is disposed within the annular channel between opposing radial surfaces of the sleeve seal and the retaining device.

In one embodiment, the first sealing element comprises a C-seal defining an annular shaped opening for receiving fluid from the inlet portion of the rotary valve body.

In one embodiment, the seal assembly further includes a second sealing element disposed within an annular channel formed in a portion of the sleeve seal.

DETAILED DESCRIPTION

Figure 1:
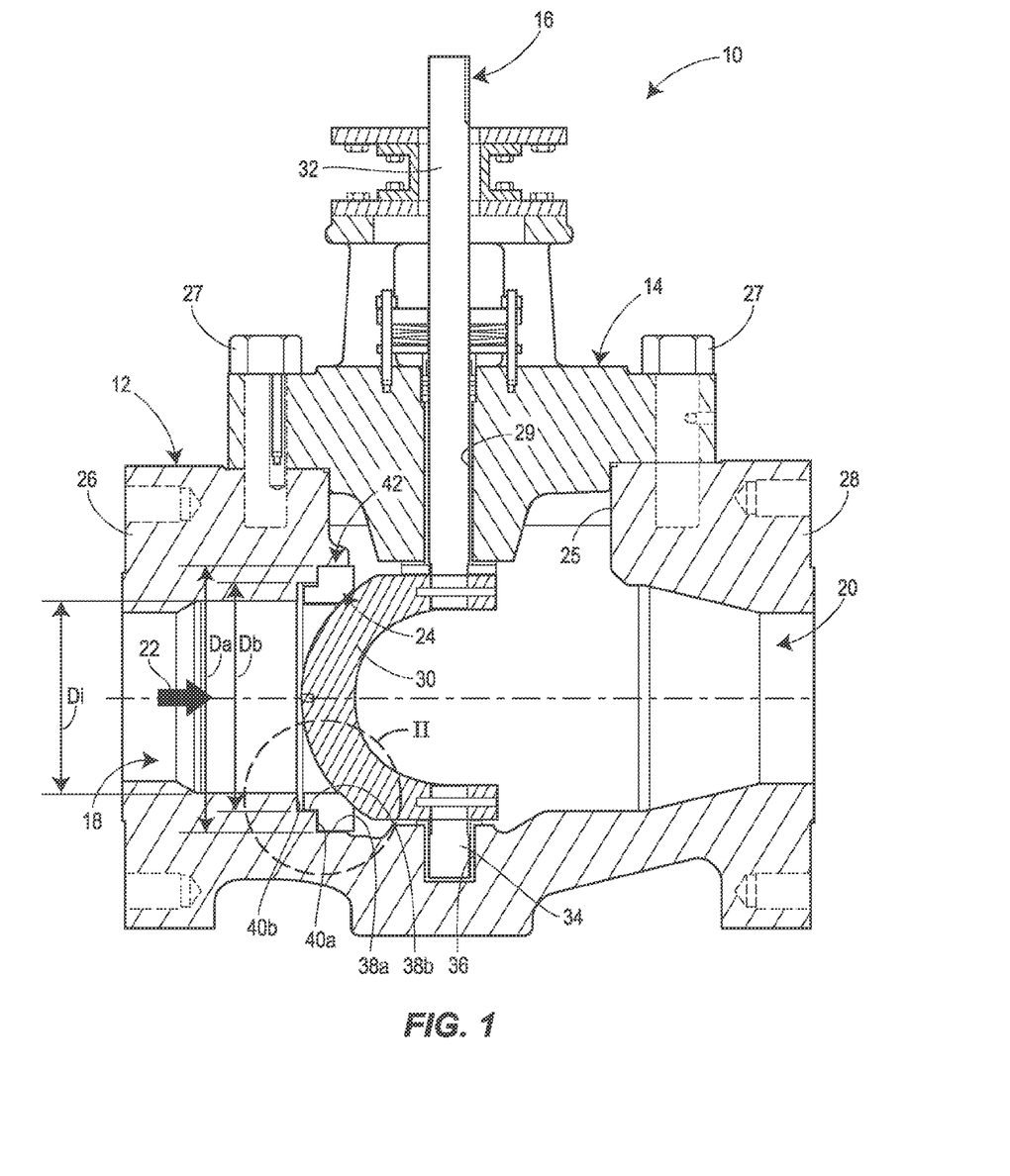
FIG. 1 is a cross-sectional view of one embodiment of a rotary ball valve constructed in accordance with the principles of the present disclosure including a sleeve seal assembly.

FIG. 1 depicts a rotary ball valve 10 constructed in accordance with the principles of the disclosure, and generally including a valve body 12, a bonnet 14, a control assembly 16, and a seal assembly 24. The valve body 12 has a generally cylindrical shape and includes an inlet portion 18, an outlet portion 20, a primary flow path 22, and a bonnet opening 25. As indicated by the arrow depicted in the inlet portion 18 of the valve body 12, the primary flow path 22 extends from the inlet portion 18 to the outlet portion 20. The inlet portion 18 is surrounded by an inlet flange 26. The outlet portion 20 is surrounded by an outlet flange 28. The inlet flange 26 and the outlet flange 28 are adapted to couple the ball valve 10 into a process control pipeline by bolting, welding, clamping, or otherwise.

The bonnet 14 includes a generally cylindrical structure bolted into the bonnet opening 25 of the valve body 12 with a plurality of bonnet bolts 27. The bonnet 14 defines a through-bore 29 that supports various components of the control assembly 16. The control assembly 16 includes a ball element 30, a drive shaft 32, and a support shaft 34. The drive shaft 32 is disposed through the through-bore 29 in the bonnet 14 and is adapted to be coupled to a rotary actuator (not shown). The support shaft 34 is disposed within a blind bore 36 formed in a wall of the valve body 12 that is opposite the bonnet opening 25. The through-bore 29 in the bonnet 14 and the blind bore 36 in the valve body 12 can include bearings to facilitate consistent unencumbered rotational displacement of the shafts 32, 34 and, therefore, the ball element 30, during operation of the ball valve 10. In the disclosed embodiment, the ball element 30 can include a cammed ball element, as is known in the art, to facilitate a repeatable seal with the seal assembly 24 when in the closed position (shown in FIG. 1).

The seal assembly 24 is mounted in the valve body 12 at an interior location that is completely downstream from the inlet portion 18 and the inlet flange 26. That is, the seal assembly 24 of the present embodiment is disposed between the inlet portion 18 and the outlet portion 20 of the valve body 12. Moreover, the seal assembly 24 is disposed adjacent to the bonnet opening 25. So configured, when the seal assembly 24 requires replacement, the bonnet 14 and control assembly 16 can be removed from the valve body 12, the old seal assembly 24 can be removed from the bonnet opening 25, and a new seal assembly 24 can be loaded through the bonnet opening 25. Therefore, in this embodiment, the bonnet opening 25 has a dimension such as a diameter, for example, that is larger than the largest dimension, e.g., diameter, of the seal assembly 24. This configuration eliminates the need to decouple the entire valve 10 from its associated pipeline to replace the seal assembly 24, which is highly advantageous when the valve 10 is butt-welded into position and expensive to decouple.

To accommodate the seal assembly 24, the disclosed embodiment of the valve body 12 defines an internal recess 42 disposed coaxially with and completely downstream from the inlet portion 18 of the valve body 12. Said another way, the internal recess 42 is disposed between the inlet portion 18 of the valve body 12 and the ball element 30 of the control assembly 16, as well as between the inlet portion 18 and the outlet portion 20 of the valve body 12. The recess 42 of the disclosed embodiment is generally annular in shape and has a stepped cross-sectional profile defined by internal surfaces of the valve body 12 including first and second cylindrical surfaces 38a, 38b, and first and second axial surfaces 40a, 40b.

The second cylindrical surface 38b is disposed between the inlet portion 18 of the valve body 12 and the first cylindrical surface 38a. Similarly, the second axial surface 40b is disposed between the inlet portion 18 of the valve body 12 and the first axial surface 40a. Moreover, as illustrated, the recess 42 of the valve body 12 includes a dimension, e.g., a diameter, that is larger than the inlet portion 18. Specifically, in FIG. 1, the first cylindrical surface 38a has a first diameter Da that is larger than a second diameter Db of the second cylindrical surface 38b, and each of the first and second diameters Da, Db is larger than an inlet diameter Di of the inlet portion 18 of the valve body 12. The general relationship of the recess having a larger dimension than the inlet portion applied not only to the valve body 12 depicted in FIG. 1, but also to each of the valve bodies described below with reference to FIGS. 2-7.

With the valve body 12 so configured, the seal assembly 24 is mounted in the valve 10 through the bonnet opening 25, as mentioned above, thereby enabling the valve to be used in environments that require the inlet and outlet flanges 26, 28 to be butt-welded in-line, as opposed to bolted in-line configurations. Of course, this design could also be used with bolted flanges, or otherwise. The seal assembly 24 of the disclosed embodiment is disposed in the internal recess 42 such that when the ball element 30 is closed, as shown in FIG. 1, the seal assembly 24 is completely disposed between the ball element 30 and the inlet portion 18 of the valve body 12. As such, any force applied to the seal assembly 24 by the ball element 30 in the axial direction (i.e., opposite to the direction of the flow path 22) is resisted by the valve body 12. While the internal recess 42 of the valve body 12 depicted in FIG. 1 has been described as including a stepped cross-sectional profile defined by two particularly configured internal cylindrical surfaces 38a, 38b and axial surfaces 40a, 40b, alternative embodiments of the present disclosure can have differently configured internal cylindrical surface(s) and axial surface(s) depending, for example, on the specific design of the seal assembly 24 and/or other considerations.

Figure 2:
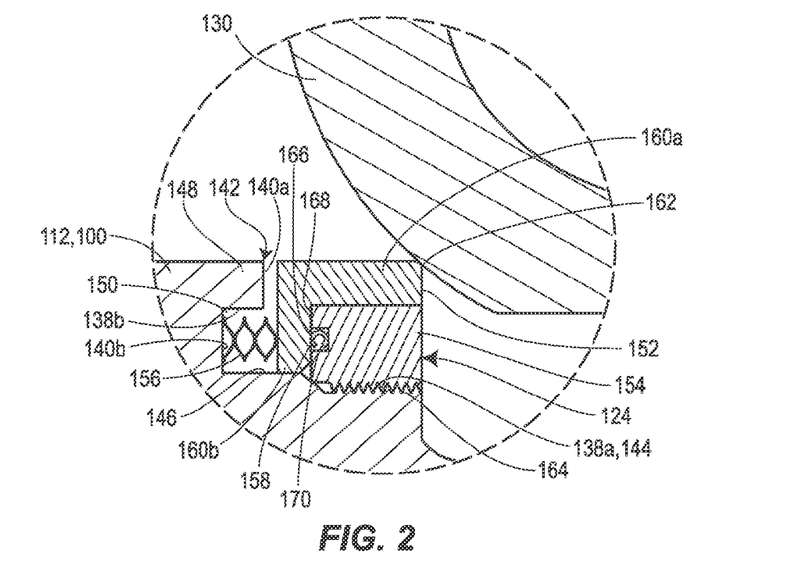
FIG. 2 is a detail view taken from circle II of FIG. 1, for example, of one embodiment of a sleeve seal assembly constructed in accordance with the principles of the present disclosure and mounted within a rotary ball valve.

For example, FIG. 2 depicts one embodiment of a sleeve seal assembly 124 constructed in accordance with the principles of the present disclosure and mounted within a valve body 112 of a rotary ball valve 100 having an internal recess 142 with a different configuration from that described above with reference to FIG. 1. The internal recess 142 depicted in FIG. 2 includes first and second internal cylindrical surfaces 138a, 138b, and first and second axial surfaces 140a, 140b. The first internal cylindrical surface 138a includes a threaded portion 144 and an unthreaded portion 146. The second internal cylindrical surface 138b is disposed radially inward of the first internal cylindrical surface 138a and faces the unthreaded portion 146 of the first internal cylindrical surface 138a. The first and second axial surfaces 140a, 140b are offset from each other. So configured, the valve body 112 defines an annular wall 148 disposed radially inward from the first internal cylindrical surface 138a. The annular wall 148 and the unthreaded portion 146 of the first internal cylindrical surface 138a define an annular channel 150.

Still referring to FIG. 2, the seal assembly 124 of this embodiment includes a sleeve seal 152, a retaining device 154, a biasing member 156, and a sealing element 158. The sleeve seal 152 includes a ring-shaped member having a sealing leg portion 160a and a biased leg portion 160b, the combination of which define an L-shaped cross-section. The sealing leg portion 160a defines a seating surface 162 for being engaged by a ball element 130 of the valve 100 when in the closed position, as shown.

The retaining device 154 is a generally ring-shaped member having a square cross-section with an outer threaded surface 164. The outer threaded surface 164 is threaded into the threaded portion 144 of the first internal cylindrical surface 138a of the recess 142 in the valve body 112. As such, the retaining device 154 is fixed into the recess 142 and retains the sleeve seal 152 in the valve body 112. Additionally, as depicted, the retaining device 154 includes an annular channel 166 disposed in an axial end surface 168 of the retaining device 154. The sealing element 158 is disposed in the annular channel 166. So configured, the sealing element 158 is disposed at an interface between opposing axial surfaces of the sleeve seal 152 and the retaining device 154 to provide a fluid tight seal. In the disclosed embodiment, the sealing element 158 comprises a C-seal defining an annular shaped opening 170. The annular shaped opening 170 is arranged such that fluid traveling from the inlet portion 18 of the valve body 12 depicted in FIG. 1, for example, can pass through the opening 170 to expand the C-seal and facilitate sealing engagement.

Finally, as illustrated in FIG. 2 and as mentioned above, the seal assembly 124 includes the biasing member 156. The biasing member 156 of the disclosed embodiment includes a wave spring disposed in the annular channel 150 in the valve body 112. So configured, the biasing member 156 applies an axial force to the biased leg portion 160b of the sleeve seal 152, thereby forcing the sleeve seal 152 away from the second axial surface 140b and into engagement with the ball element 130 when the ball element 130 is in the closed position, as depicted. While the biasing member 156 is described as a wave spring, any other device for achieving the intended purpose could also be incorporated into the seal assembly 124 without departing from the scope of the disclosure.

With the seal assembly 124 configured as described, the sleeve seal 152 is adapted to move axially relative to the retaining device 154 during operation of the valve 100. That is, when the ball element 130 is in an open position, it is moved away from the seating surface 162 of the sleeve seal 152, and the biasing member 156 pushes the sleeve seal 152 toward the right relative to the orientation of FIG. 2, such that the biased leg portion 160b of the sleeve seal 152 tightly engages and seals against the sealing element 158 and perhaps also the axial end surface 168 of the retaining device 154. However, when the ball element 130 engages the seating surface 162 of the sleeve seal 152, as shown, the ball element 130 moves the sleeve seal 152 to the left relative to the orientation of FIG. 2. This movement is due to the fact that the ball element 130 comprises a cammed ball, as is known in the art. As the sleeve seal 152 moves to the left, the biased leg portion 160b moves away from the axial end surface 168 of the retaining device 154, and begins to move away from the sealing element 158. The biased leg portion 160b, however, maintains sealing contact with the sealing element 158 because as the biased leg portion 160b begins to move away, fluid traveling through the valve body 112 travels into the recess 142, passed the biasing member 156, between the biased leg portion 160b of the sleeve seal 152 and the valve body 112, and into the annular opening 170 in the sealing element 158. This fluid is pressurized because the ball element 130 is in the closed position, and as such, the sealing element 158 expands to maintain a fluid tight seal with the biased leg portion 160b of the sleeve seal 152. As the ball element 130 moves away from the seating surface 162 of the sleeve seal 152 and into an open position, the biasing member 156 returns the sleeve seal 152 back to its original position.

In the manner described above, the sealing element 158 of the presently described embodiment serves as a dynamic seal because it provides a fluid tight seal between two separate components, at least one of which moves relative to the other and furthermore because it changes its orientation, configuration, and/or arrangement, for example, to maintain the fluid tight seal regardless of the position of the movable component(s). While the sealing element 158 has been described herein as comprising a C-seal with an annular opening 170, other dynamic seals for serving the intended purpose could also be incorporated into the device with departing from the scope of the disclosure.

Figure 3:
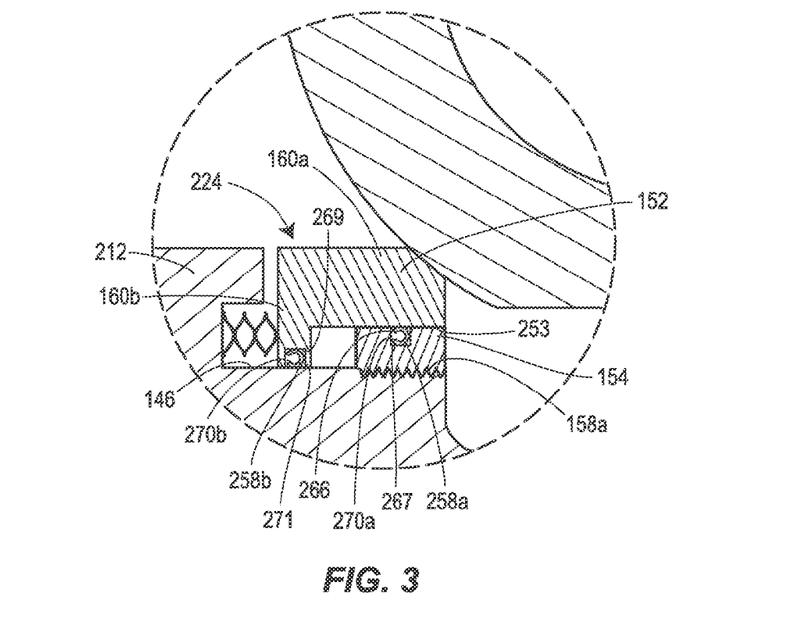
FIG. 3 is a detail view of another embodiment of a sleeve seal assembly constructed in accordance with the principles of the present disclosure and mounted within a rotary ball valve.

FIG. 3 illustrates another embodiment of a seal assembly 224 constructed in accordance with the principles of the disclosure and mounted within a valve body 212 that is identical to the valve body 112 described above with reference to FIG. 2. The seal assembly 224 is also generally identical to the seal assembly 124 described above with reference to FIG. 2, and therefore, like reference numerals will be used to identify like features. The primary distinction between the seal assembly 224 in FIG. 3 and the seal assembly 124 in FIG. 2 is the means by which a seal is provided between the sleeve seal 152 and the retaining device 154 and/or valve body 212. That is, in FIG. 2, a fluid tight seal is provided between the sleeve seal 152 and the retaining device 154 with the sealing element 158, which is disposed between opposing axial end surfaces of the retaining device 154 and a biased leg portion 160b of the sleeve seal 152. In contrast, the seal assembly 224 of FIG. 3 provides a fluid tight seal between the sleeve seal 152 and the retaining device 154 via a first sealing element 258a disposed between opposing radial surfaces of the sleeve seal 152 and the retaining device 154. More specifically, the first sealing element 258a is disposed in an annular channel 266 formed in an inner cylindrical surface 267 of the retaining device 154 and sealingly engages an outer cylindrical surface 253 of the seating leg portion 160 of the sleeve seal 152. As illustrated, in this embodiment, the first sealing element 258a includes a C-seal defining an annular opening 270a facing upstream, i.e., toward an inlet portion 18 (shown in FIG. 1) of the valve 212.

In addition to the first sealing element 258a, the seal assembly 224 of FIG. 3 also includes a second sealing element 258b. In the disclosed embodiment, the second sealing element 258b is disposed within an annular channel 269 formed in an outer cylindrical surface 271 of the biased leg portion 160b of the sleeve seal 152, and sealingly engages the unthreaded portion 146 of the first inner cylindrical surface 158a of the valve body 212. As illustrated, the second sealing element 258b of this embodiment also includes a C-seal defining an annular opening 270b facing upstream, i.e., toward an inlet portion 18 (shown in FIG. 1) of the valve 212.

So configured, the first and second sealing elements 258a, 258b of the embodiment of FIG. 3 are radial seals. During operation, fluid traveling from the inlet portion 18 passes between the valve body 212 and the biased portion 160b of the sleeve seal 152 such that it enters the annular opening 270b of the second sealing element 258b disposed at the radial interface between the sleeve seal 152 and the valve body 212. This fluid expands the second sealing element 258b and provides a fluid tight seal preventing leakage. In the event that some fluid leaks past the second sealing element 258b, the first sealing element 258a is designed to provide a redundant seal. That is, some portion of the leaked fluid can enter the annular opening 270a of the first sealing element 270a to expand the seal and provide a fluid tight seal. As mentioned, the first sealing element 258a operates as a redundant seal, and therefore, in some embodiments, the first sealing element 258a is optional. Similar to that discussed above, while the sealing elements 258a, 258b of the seal assembly 224 of FIG. 3 have been described as C-seals, any other types of seals could be used.

Figure 4:
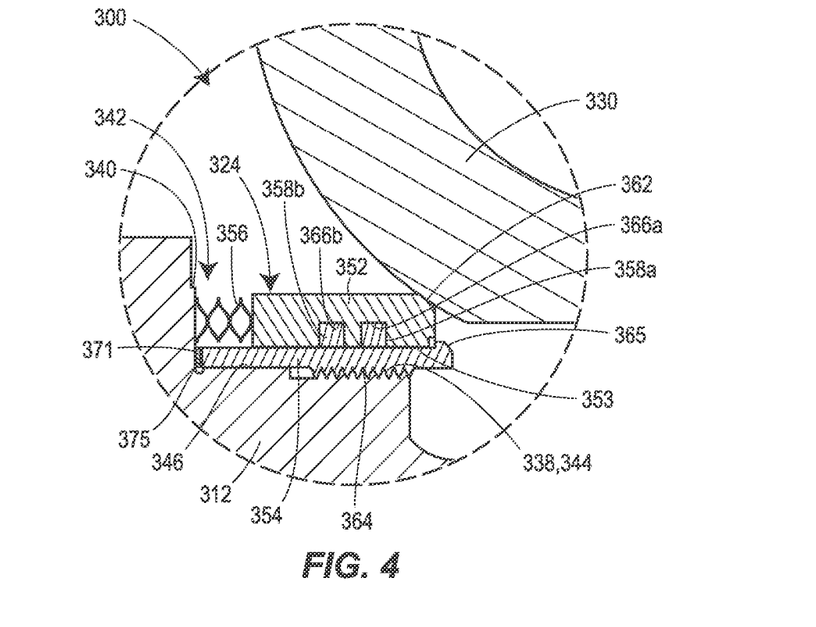
FIG. 4 is a detail view of another embodiment of a sleeve seal assembly constructed in accordance with the principles of the present disclosure and mounted within a rotary ball valve.

FIG. 4 depicts yet another embodiment of a seal assembly 324 constructed in accordance with the principles of the present disclosure. The seal assembly 324 is mounted within a valve body 312 of a valve 300 that is generally similar to the valve body 12 described above with reference to FIG. 1. The valve body 312 in FIG. 4 defines an internal recess 342 that has a slightly different cross-sectional profile than the corresponding annular recess 42 of FIG. 1. That is, the recess 342 of the valve body 312 of FIG. 4 only includes a single internal cylindrical surface 338 and a single axial surface 340, thereby defining the recess 342 as having a generally square cross-sectional profile. The internal cylindrical surface 338 includes a threaded portion 344 and an unthreaded portion 346.

The seal assembly 324, similar to the previously described seal assemblies 124, 224, includes a sleeve seal 352, a retaining device 354, and a biasing member 356. The sleeve seal 352 includes a generally ring-shaped member defining a seating surface 362 adapted to be engaged by a ball element 330, as shown. Additionally, the sleeve seal 352 includes a pair of annular channels 366a, 366b disposed on an outer cylindrical surface 353 of the sleeve seal 352. The annular channels 366a, 366b contain radial seals 358a, 358b, respectively. The radial seals 358a, 358b could include graphite piston rings, C-seals, or generally any other type of seal.

The retaining device 354 includes a generally ring-shaped member having an external threaded portion 364 threaded into the threaded portion 344 of the internal cylindrical surface 338 of the valve body 312. Moreover, as shown, the retaining device includes a flange portion 365 that extends radially inward to secure the sleeve seal 352 in the valve body 312, as shown. The retaining device 354 further includes a gasket seal 371 disposed between an axial end surface 375 of the retaining device 354 and the valve body 312 to provide a fluid tight seal therebetween. An alternative embodiment could include a continuous weld bead for providing this seal instead of the gasket seal 371.

Finally, the biasing member 356 of the disclosed embodiment includes a wave spring similar to that described above. The biasing member 356 is disposed between the axial surface 340 of the valve body 312 and the sleeve seal 352 to bias the sleeve seal 352 away from the axial surface 340. So configured, when the ball element 330 is in an open position, disposed away from the seating surface 362 carried by the sleeve seal 352, the biasing member 356 applies a generally continuous force to the sleeve seal 352 to urge the sleeve seal 352 into engagement with the flange 365 carried by the retaining device 354. As the ball element 330 moves into the closed position, however, the ball element 330 forces the sleeve seal 352 away from the flange 365, as shown in FIG. 4, but the biasing member 356 continues to urge the seating surface 362 of the sleeve seal 352 into the ball element 330 to provide a tight seat and prevent leakage between the sleeve seal 352 and the ball element 330. To prevent leakage between the sleeve seal 352 and the retaining device 354, the radial seals 358a, 358b disposed in the annular channels 366a, 366b in the sleeve seal 352 provide sealing engagement against the internal cylindrical surface of the retaining device 354, as shown. Finally, as mentioned, the gasket seal 371 disposed between the axial end surface 375 of the retaining device 354 and the axial surface 340 of the valve body 312 prevents leakage between the valve body 312 and the retaining device 354.

Figure 5:
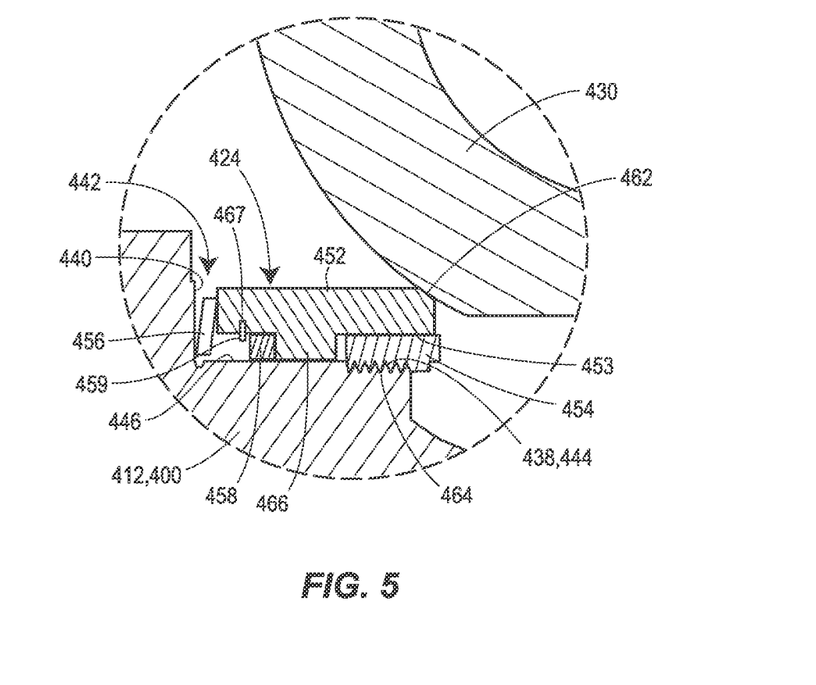
FIG. 5 is a detail view of yet another embodiment of a sleeve seal assembly constructed in accordance with the principles of the present disclosure and mounted within a rotary ball valve.

FIG. 5 depicts yet another embodiment of a seal assembly 424 constructed in accordance with the principles of the present disclosure. The seal assembly 424 is mounted within a valve body 412 of a valve 400 that is generally similar to the valve body 12 described above with reference to FIG. 1. The valve body 412 in FIG. 5 is identical to the valve body 312 in FIG. 4, and therefore, defines an annular recess 442 that includes a single internal cylindrical surface 438 and a single axial surface 440, thereby defining the recess 442 as having a generally square cross-sectional profile. The internal cylindrical surface 438 includes a threaded portion 444 and an unthreaded portion 446.

The seal assembly 442, similar to the previously described seal assemblies 124, 224, 324, includes a sleeve seal 452, a retaining device 454, and a biasing member 456. The sleeve seal 452 includes a generally ring-shaped member defining a seating surface 462 adapted to be engaged by a ball element 430, as shown. Additionally, the sleeve seal 452 includes an outer annular protrusion 466 extending away from an outer cylindrical surface 453 of the sleeve seal 452. Furthermore, the sleeve seal 452 includes an annular recess 467 formed in the outer cylindrical surface 453. The annular recess 467 receives a retaining ring 459 such as a C-clip, for example, for retaining a seal element 458 on the outer cylindrical surface 453 adjacent to the annular protrusion 466, as shown. As also shown in FIG. 5, the retaining device 454 is a generally ring-shaped member having a threaded outer surface 464 threaded into the threaded portion 444 of the internal cylindrical surface 438 of the valve body 412. So configured, the retaining device 454 retains the sleeve seal 452 in the recess 442.

Finally, the biasing member 456 of the disclosed embodiment includes a conical washer such as a Belleville washer. The biasing member 456 is disposed between the axial surface 440 of the valve body 412 and the sleeve seal 452 to bias the sleeve seal 452 away from the axial surface 440. So configured, when the ball element 430 is in an open position, disposed away from the seating surface 462 carried by the sleeve seal 452, the biasing member 456 applies a generally continuous force to the sleeve seal 452 to urge the sleeve seal 452 such that the outer annular protrusion 466 contacts the retaining device 454. As the ball element 430 moves into the closed position, however, the ball element 430 forces the sleeve seal 452 away from the retaining device 454, as shown in FIG. 5, but the biasing member 456 continues to urge the seating surface 462 of the sleeve seal 452 into the ball element 430 to provide a tight seat and prevent leakage between the sleeve seal 452 and the ball element 430. Moreover, to prevent leakage between the sleeve seal 452 and the valve body 412, the seal element 458 disposed on the outer cylindrical surface 453 of the sleeve seal 452 sealingly engages the unthreaded portion 446 of the internal cylindrical surface 438 of the valve body 412.

Figure 6:
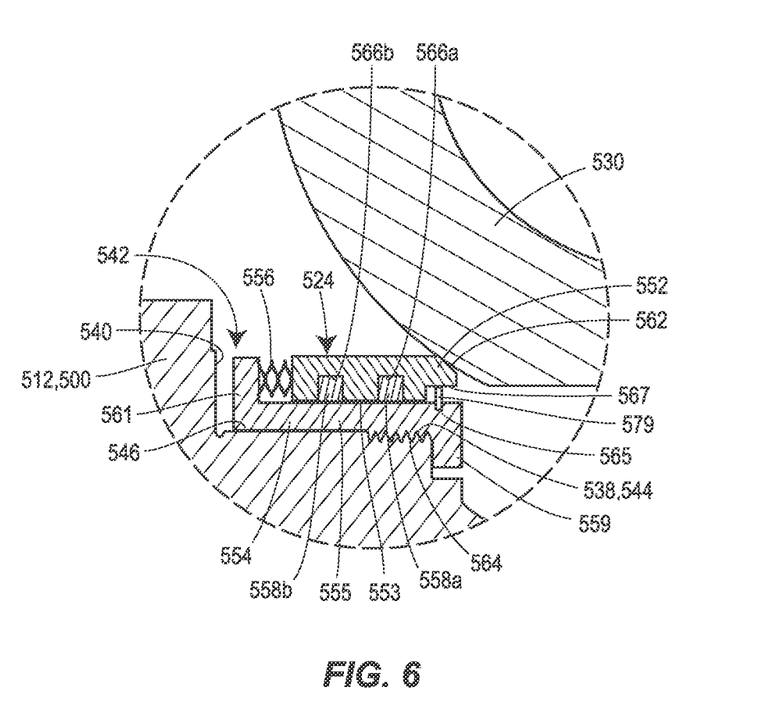
FIG. 6 is a detail view of still another embodiment of a sleeve seal assembly constructed in accordance with the principles of the present disclosure and mounted within a rotary ball valve.

FIG. 6 depicts still another embodiment of a seal assembly 524 constructed in accordance with the principles of the present disclosure. The seal assembly 524 is mounted within a valve body 512 of a valve 500 that is generally similar to the valve body 12 described above with reference to FIG. 1. Moreover, the valve body 512 in FIG. 6 is identical to the valve bodies 312, 412 in FIGS. 4 and 5. As such, the valve body 512 includes a single internal cylindrical surface 538 and a single axial surface 540, thereby defining the recess 542 as having a generally square cross-sectional profile. The internal cylindrical surface 538 includes a threaded portion 544 and an unthreaded portion 546.

Similar to those described above, the seal assembly 542 of FIG. 6 includes a sleeve seal 552, a retaining device 554, and a biasing member 556. The sleeve seal 552 includes a generally ring-shaped member defining a seating surface 562 adapted to be engaged by a ball element 530, as shown. Additionally, the sleeve seal 552 includes a pair of annular channels 566a, 566b and an annular notch 567 disposed on an outer cylindrical surface 553 of the sleeve seal 552. The annular channels 566a, 566b contain radial seals 558a, 558b, respectively. The radial seals 558a, 558b could include graphite piston rings, C-seals, or generally any other type of seal.

The retaining device 554 includes a generally ring-shaped central member 555, an annular mounting flange 559, an annular biasing flange 561, and an external threaded portion 564. The external threaded portion 564 is threaded into the threaded portion 544 of the internal cylindrical surface 538 of the valve body 512 such that the annular mounting flange 559 abuts a portion of the valve body 512 adjacent to the recess 542. So configured, the annular biasing flange 561 is disposed within the recess 542, as shown. Moreover, as shown, the retaining device includes an annular recess 565 on an internal cylindrical surface 363 thereof. The annular recess 565 receives a retaining ring 579 such as a C-clip, for example, which extends into the annular notch 567 of the sleeve seal 542 to retain the sleeve seal 542 in the recess 542 of the valve body 512.

Finally, the biasing member 556 of the disclosed embodiment includes a wave spring similar to that described above. The biasing member 556 is disposed between the annular biasing flange 561 of the retaining device 554 and the sleeve seal 552 to bias the sleeve seal 552 away from the biasing flange 561. So configured, when the ball element 530 is in an open position, disposed away from the seating surface 562 carried by the sleeve seal 552, the biasing member 556 applies a generally continuous force to the sleeve seal 552 to urge the sleeve seal 552 into engagement with the retaining ring 579 carried by the retaining device 554. As the ball element 530 moves into the closed position, however, the ball element 530 forces the sleeve seal 552 away from the retaining ring 579, as shown in FIG. 6, but the biasing member 556 continues to urge the seating surface 562 of the sleeve seal 552 into the ball element 530 to provide a tight seat and prevent leakage between the sleeve seal 552 and the ball element 530. Moreover, to prevent leakage between the sleeve seal 552 and the retaining device 554, the radial seals 558a, 558b disposed in the annular channels 566a, 566b in the sleeve seal 552 provide sealing engagement against the internal cylindrical surface of the retaining device 554, as shown.

In view of the foregoing, it should be appreciated that the present disclosure provides a fluid control device such as a rotary ball valve including a movable ball element that selectively engages a seal assembly that is mounted inside of the valve body, and loaded through a bonnet opening of the valve body. This configuration advantageously enables the seal assembly to be replaced without having to decouple the entire fluid control device from its associated process control line. It should further be appreciated that the present disclosure provides several seal assemblies designed to provide reliable sealing for a ball element of a rotary ball valve, for example, by biasing a sleeve seal component generally continuously against the ball element. Moreover, each of the disclosed seals advantageously includes one or more sealing elements strategically arranged and configured to prevent leakage between the movable sleeve seal and a retaining device and/or the valve body itself. While the seal assemblies of the present disclosure have thus far been described as being coupled to an interior of a valve body, such as that described with reference to FIG. 1, it is foreseeable that the seal assemblies could be used in other types of valve bodies, including even prior art rotary valve bodies such as those where conventional seal assemblies are loaded in through the inlet portion and retained with a seal protector ring.

As illustrated, each of the seal assemblies 124, 224, 324, 424, 524 includes a sleeve seal 152, 252, 352, 452, 552 defining a seating surface 162, 262, 362, 462, 562 that constitutes an exposed surface of the sleeve seal and nothing more. While this configuration provides sufficient seating in most applications, some applications may benefit from a slightly different design of a sleeve seal.

Figure 7:
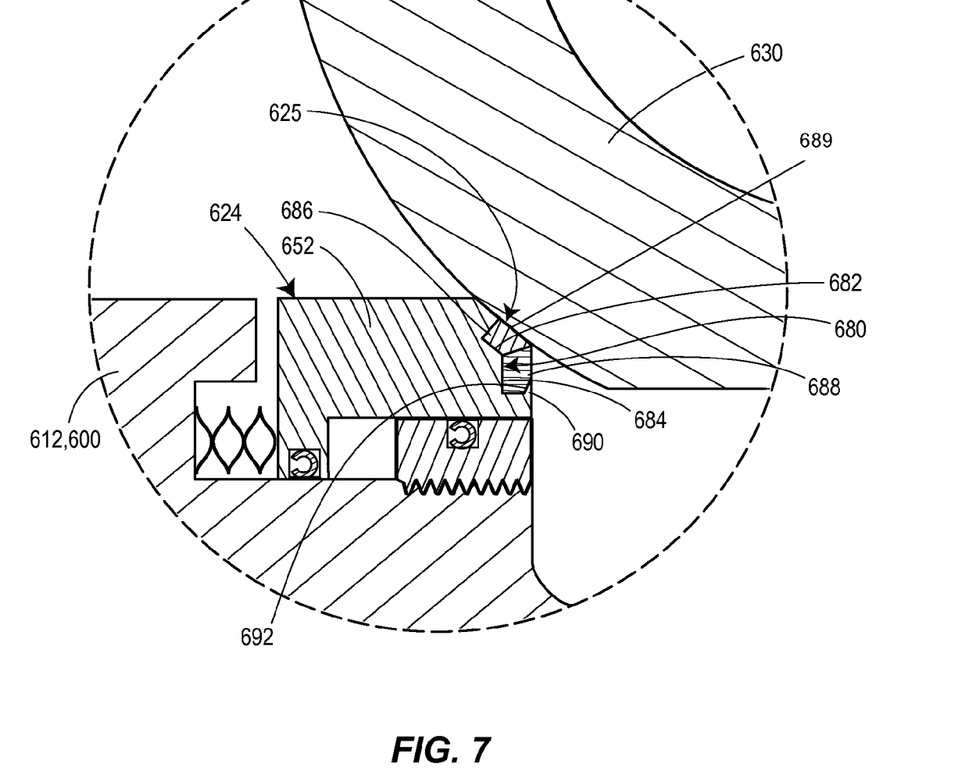
FIG. 7 is a detail view of still yet another embodiment of a sleeve seal assembly constructed in accordance with the principles of the present disclosure and mounted within a rotary ball valve.

For example, FIG. 7 depicts a seal assembly 624 mounted within a valve body 612 of a valve 600, each of which are identical to the seal assembly 224 and valve body 212 of the embodiment depicted in FIG. 3, with the exception that the seal assembly 624 also includes a sleeve seal 652 having a sealing insert 625.

More specifically, the sleeve seal 652 defines an annular channel 680 receiving the sealing insert 625. The annular channel 680 includes a first portion 682 and a second portion 684 circumscribing the first portion 682. In the disclosed embodiment, the first and second portions 682, 684 are disposed at an angle relative to each other.

The sealing insert 625 includes a sealing insert ring 686 and a back-up ring 688. The sealing insert ring 686 is disposed within the first portion 682 of the annular channel 680 of the sleeve seal 652, and defines an annular seating surface 689 against which the ball element 630 sealingly engages when occupying a closed position, as shown in FIG. 7. The back-up ring 688 is disposed within the second portion 684 of the annular channel 680, thereby circumscribing the sealing insert ring 686. Adjacent to the annular channel 680, the sleeve seal 652 defines a radial lip 690 extending over an outer radial portion 692 of the back-up ring 688. As such, the radial lip 690 retains the back-up ring 688 in the second portion 684 of the annular channel 680. As the back-up ring 688 is disposed immediately adjacent and in contact with the sealing insert ring 686, the radial lip 690 also retains the sealing insert ring 686 in the first portion 682 of the annular channel 680. In one embodiment, the radial lip 690 can extend entirely about the outer radial circumference of the back-up ring 688. In other embodiments, the radial lip 690 can include a plurality of radial tabs spaced apart about the outer radial circumference of the back-up ring 688. In one embodiment, the radial lip 690 is formed by a rolling operation performed on the metal that constitutes the portion of the sleeve seal 652 disposed adjacent to the second portion 684 of the annular channel 680. In other embodiments, the sealing insert ring 686 and back-up ring 688 can be secured in the annular channel 680 through other means such as adhesive or some other mechanical fastener, for example.

While various different materials could be used for the sealing insert ring 686 and back-up ring 688, in one embodiment the sealing insert ring 686 is formed of a softer material than the back-up ring 688 such that the back-up ring 688 serves as a supporting structure. For example, the sealing insert ring 186 could be formed of polyetheretherkeytone (PEEK) or carbon, and the back-up ring 188 could be constructed of a non-compliant metal material. Other materials could be used for either of these components, whether the components are made from the same material or different materials.

Based on the foregoing, it should be appreciated that the present invention includes a variety of modifications and alternative embodiments, all of which are intended to be covered by the scope of the pending claims and any equivalents thereof. Moreover, the scope of the invention is not intended to be limited to the specific embodiments described herein, but rather, is intended to be defined by the spirit and scope of the pending claims.

The invention claimed is:

1. A fluid flow control device, comprising:
a valve body defining an inlet portion, an outlet portion, a bonnet opening, and a fluid flow path extending between the inlet portion and the outlet portion;
a bonnet disposed in the bonnet opening and secured to the valve body;
a control assembly at least partly supported by the bonnet, the control assembly including a ball element disposed within the valve body and rotatable between an open position and a closed position;
an internal recess defined by the valve body at a location completely downstream from the inlet portion and adjacent the bonnet opening;
a seal assembly disposed within the internal recess of the valve body and comprising a sleeve seal, a retaining device, a biasing element, and a sealing element, the sleeve seal axially movable along a direction of the flow path and adapted to be sealingly engaged by the ball element when the ball element occupies the closed position, the sleeve seal including a sealing leg portion in sliding contact with the retaining device and a biased leg portion in sliding contact with the valve body, the retaining device attached to the valve body adjacent to the internal recess and between at least a portion of the sleeve seal and the ball element to limit displacement of the sleeve seal in the valve body toward the ball element, the biasing element having a first end seated against a portion of the valve body and a second end seated against the biased leg portion of the sleeve seal, the biasing element configured to bias the biased leg portion toward the ball element, and the sealing element arranged to provide a fluid tight seal between the sleeve seal and at least one of the retaining device and the valve body to prevent leakage when the ball element is in the closed position.

2. The device of claim 1, wherein the bonnet opening has a dimension that is greater than a largest dimension of the seal assembly.

3. The device of claim 1, wherein the recess in the valve body comprises an annular recess disposed coaxially with the inlet portion of the valve body.

4. The device of claim 1, wherein the sealing element comprises a sealing ring disposed at an interface between the sleeve seal and one of the retaining device and the valve body.

5. The device of claim 4, wherein the sealing element is disposed between opposing axial surfaces of the sleeve seal and the retaining device.

6. The device of claim 4, wherein the sealing element is disposed between opposing radial surfaces of the sleeve seal and one of the retaining device and the valve body.

7. The device of claim 1, wherein the sealing element comprises a C-seal defining an annular shaped opening for receiving fluid from the inlet portion of the valve body.

8. The device of claim 1, wherein the biasing element comprises a wave spring.

9. A fluid flow control device, comprising:
a valve body defining an inlet portion, an outlet portion, and a fluid flow path extending between the inlet portion and the outlet portion;
a control assembly comprising a ball element disposed within the valve body and rotatable between an open position and a closed position;
an internal recess defined by the valve body at a location downstream from the inlet portion;
a seal assembly disposed within the internal recess of the valve body and comprising a sleeve seal, a retaining device, a biasing element, and a C-seal, the sleeve seal axially movable along a direction of the flow path and adapted to be sealingly engaged by the ball element when the ball element occupies the closed position, the sleeve seal including a sealing leg portion in sliding contact with the retaining device and a biased leg portion in sliding contact with the valve body, the retaining device attached to the valve body adjacent to the internal recess and between at least a portion of the sleeve seal and the ball element to limit displacement of the sleeve seal in the valve body toward the ball element, the biasing element having a first end seated against a portion of the valve body and a second end seated against the biased leg portion of the sleeve seal, the biasing element configured to bias the biased leg portion toward the ball element, and the C-seal disposed between the sleeve seal and one of the retaining device and the valve body to prevent leakage when the ball element is in the closed position.

10. The device of claim 9, further comprising a bonnet opening defined by the valve body and a bonnet disposed in the bonnet opening, the bonnet at least partly supporting the control element, the bonnet opening being disposed adjacent to the seal assembly.

11. The device of claim 10, wherein the bonnet opening has a dimension that is greater than a largest dimension of the seal assembly.

12. The device of claim 9, wherein the recess in the valve body comprises an annular recess disposed coaxially with the inlet portion of the valve body.

13. The device of claim 9, wherein the C-seal is disposed between opposing axial surfaces of the sleeve seal and the retaining device.

14. The device of claim 9, wherein the C-seal is disposed between opposing radial surfaces of the sleeve seal and one of the retaining device and the valve body.

15. The device of claim 9, wherein the C-seal defines an annular shaped opening for receiving fluid from the inlet portion of the valve body.

16. A seal assembly for a rotary ball valve, the seal assembly comprising:
a sleeve seal adapted to be mounted adjacent an inlet portion of a rotary valve body and to be engaged by a ball element of the rotary ball valve when the ball element occupies a closed position, the sleeve seal including a sealing leg portion and a biased leg portion adapted to be in sliding contact with the rotary valve body;
a retaining device adapted to be attached to the rotary valve body between at least a portion of the sleeve seal and the rotary valve body to retain the sleeve seal in the rotary valve body, the sealing leg portion of the sleeve seal being in sliding contact with the retaining device, and the retaining device defining an annular channel;
a biasing element having a first end adapted to be seated against a portion of the rotary valve body and a second end adapted to be seated against the biased leg portion of the sleeve seal, the biasing element adapted to bias the biased leg portion toward the ball element;
a first sealing element disposed within the annular channel of the retaining device and adapted to provide a fluid tight seal between the sleeve seal and the retaining device to prevent leakage when the ball element is in the closed position.

17. The seal assembly of claim 16, wherein the annular channel is defined in an axial end surface of the retaining device, and wherein the first sealing element is disposed within the annular channel between opposing axial surfaces of the sleeve seal and the retaining device.

18. The seal assembly of claim 16, wherein the annular channel is defined in a radial surface of the retaining device, and wherein the first sealing element is disposed within the annular channel between opposing radial surfaces of the sleeve seal and the retaining device.

19. The seal assembly of claim 16, wherein the first sealing element comprises a C-seal defining an annular shaped opening for receiving fluid from the inlet portion of the rotary valve body.

20. The seal assembly of claim 16, further comprising a second sealing element disposed within an annular channel formed in a portion of the sleeve seal.

* * * * *